May 1, 1923.                                        1,453,385
P. DZUTSOFF
COMBINED OXYGEN AND ACETYLENE CUTTING AND WELDING TORCH
Filed July 5, 1922
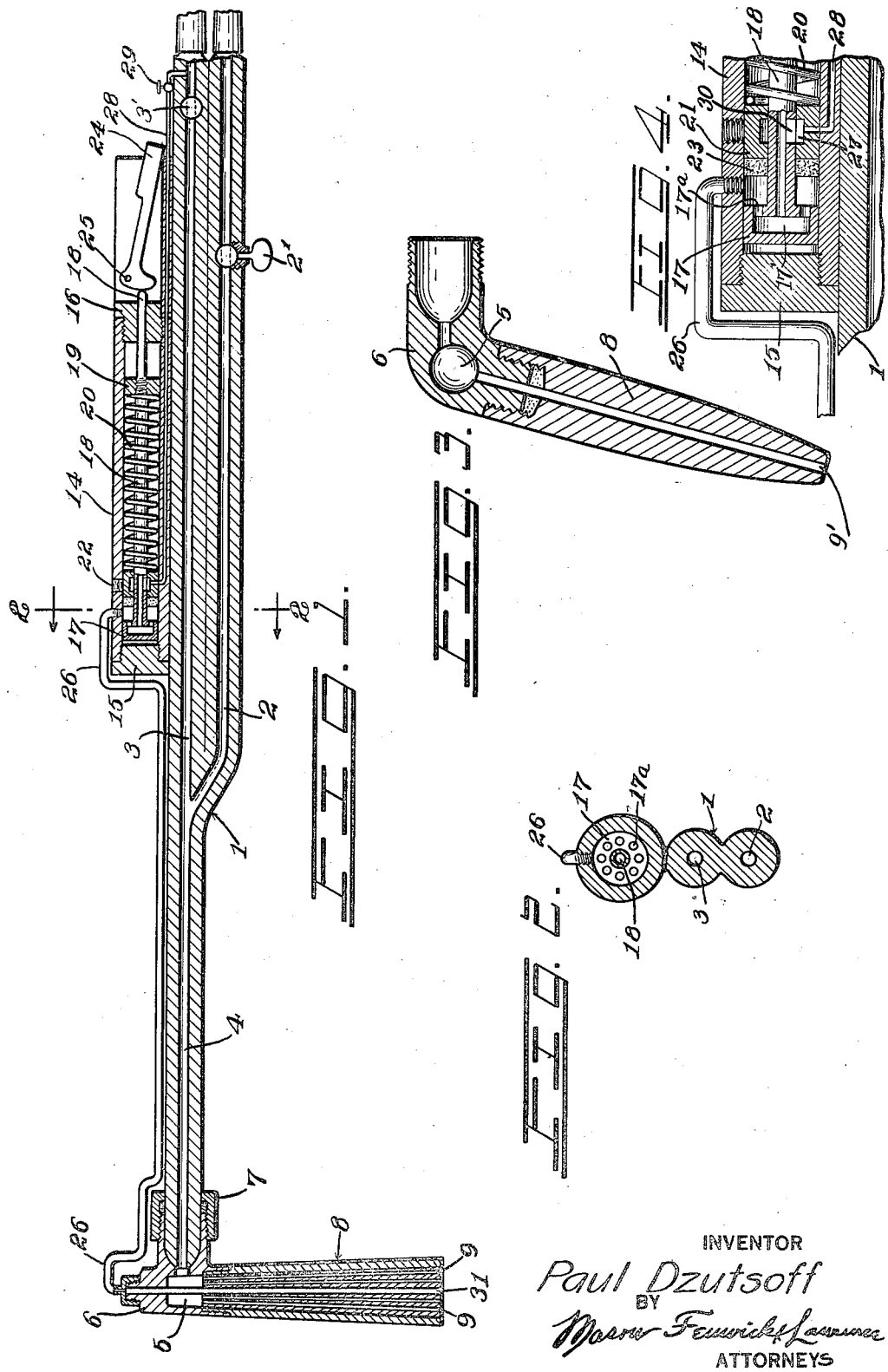
INVENTOR
Paul Dzutsoff
BY
ATTORNEYS Patented May 1, 1923.

1,453,385

UNITED STATES PATENT OFFICE.

PAUL DZUTSOFF, OF SEATTLE, WASHINGTON.

COMBINED OXYGEN AND ACETYLENE CUTTING AND WELDING TORCH.

Application filed July 5, 1922. Serial No. 572,844.

*To all whom it may concern:*

Be it known that I, PAUL DZUTSOFF, a citizen of the United States, residing at Seattle, in the county of King and State of Washington, have invented certain new and useful Improvements in Combined Oxygen and Acetylene Cutting and Welding Torches; and I do hereby declare the following to be a full, clear, and exact description of the invention, such as will enable others skilled in the art to which it appertains to make and use the same.

It is an object of this invention to provide a blow pipe that may be used for welding metal with a given supply of combined oxygen and acetylene, and which may also be used for cutting metals by the use of said given supply of gases plus an additional supply of oxygen supplied at the point of combustion unmixed with acetylene.

Another object of the invention is to provide an attachment which may be easily affixed to and used with a common form of blow pipe, whereby the use of the same may be increased for cutting as well as for use in welding.

A further object is to provide a simple and cheaply constructed apparatus for controlling the supply of oxygen which may be used in conjunction with combined oxygen and acetylene from a combustion blow pipe for cutting and welding metals.

The above and other features of novelty of the invention will appear from the detailed description thereof, taken in connection with the accompanying drawings forming a part of this specification, the scope of the invention being defined in the appended claims.

Referring to the drawings:—

Figure 1 is a longitudinal section through the improved blow pipe showing my invention;

Fig. 2 is a cross section on line 2—2 of Fig. 1;

Fig. 3 is an enlarged sectional view of one form of nozzle or blow pipe tip; and Fig. 4 is an enlarged section through the valve operating mechanism by which the additional supply of oxygen is controlled.

In the drawings, 1 indicates the body of the torch or blow pipe having conduits or tubes 2 and 3 for acetylene and oxygen, respectively, said tubes meeting in a common tube 4 which opens into a chamber 5 in a head piece 6 which is attached to the discharge end of the body or blow pipe, this head piece being secured to the body of the blow pipe by any suitable means as a nut 7. The head may have attached to it any suitable form of nozzle 8. In Fig. 1 the nozzle is shown as having a plurality of discharge openings 9 whereas in Fig. 3 a nozzle having a single discharge opening 9' is shown. The flow of gases into tubes 2 and 3 are controlled by suitable valves indicated diagrammatically at 2' and 3'. The above described apparatus is that commonly used for welding metal by use of a burner nozzle of preferably the form shown in Fig. 3.

For the purpose of cutting metal a higher heat is desired. To this end, more oxygen is supplied. In order to control this additional supply of oxygen with exactness and ease, I have devised a novel controlling means which I will now describe. Mounted on the body 1 is a valve carrier or tube member 14 which is closed at its ends by screw plugs 15 and 16. Operating at the ends of the carrier 14 adjacent the plug 15 is a piston or piston valve 17 having a stem or rod 18 which extends through the remote plug 16. Fixed to the stem 18 is a collar 19 and abutting the collar is a spring 20 which at its other end reacts against an abutment 21 fixed within the carrier 14 as by a set screw 22, the piston rod passing through the abutment. In front of the abutment surrounding the piston rod 18 is a packing member 23 against which the adjacent face of the piston is adapted to engage. The spring tends to draw the piston 17 against this packing. A cam lever 24 pivoted as at 25 to the carrier 14 and operating on the stem 18 serves to force said piston away from said packing for purposes which will hereinafter appear. It will now be seen that the piston operates in a chamber whose ends are defined by the plug 15 and the abutment 21.

Connected with said chamber and leading to the nozzle head is a tube 26. The abutment 21 has a chamber 27 to which is connected an oxygen supply pipe 28 having a controlling valve 29 Fig. 1, of any suitable form, the pipe being connected to supply pipe 3 at the handle end of the torch or blow pipe.

The piston is chambered as at 17' and has ports 17ª facing the packing 23. The piston rod 18 has a passageway or port 30 leading from said chamber 17' in the piston into connection with chamber 27 in the abutment 21. It will now be seen that a passageway is established between pipes 26 and 28 when the piston is removed from the packing 23 as shown in the drawings. The pipe 26 is extended by means of a separate pipe 31 to the flame side end of the blow pipe as shown in Fig. 1.

Normally the inner end of the piston is tightly held against the packing body 23 by the spring 20. When the operator desires to move the piston away from the packing body he presses down on the cam lever 24 which then forces the rod and piston toward the plug 15 or to the position shown in Fig. 1.

When the operator desires to shut off the extra supply of oxygen, the lever 24 is raised whereupon the spring forces the piston against said packing and consequently closes the passageway between pipes 26 and 28. It will be understood that the passageway is closed by reason of the fact that the outlet holes 17$^a$ in the piston face are held against the soft packing body 23. A permanent shut-off may be had at the valve 29 as will be readily understood.

The above described mechanism for controlling the additional supply of oxygen is simple and efficient in use and can readily be applied to existing blow pipes. While I have described the invention with considerable particularity, I desire it to be understood that I intend no limitations except that it may be defined or imposed by the appended claims.

What I claim is:—

1. The combination with a blow pipe, of a gas-controlled valve comprising a chamber, a piston movable therein a piston rod connected with said piston, a conduit leading from the chamber to the nozzle of the blow pipe, a supply conduit, a chambered abutment to which said supply conduit connects and through which the piston rod passes, said piston rod having a gas-conducting passage in communication with the piston chamber and the abutment chamber when the piston is removed from the said abutment.

2. The combination with a blow pipe, of a gas-controlling valve comprising a chamber, a piston movable therein, a piston rod connected with said piston, a conduit leading from the chamber to the nozzle of the blow pipe, a supply conduit, a chambered abutment to which said supply conduit connects and through which the piston rod passes, said piston constituting a chambered head having opening into said chamber in its face adjacent said abutment, said piston rod having a passageway between the chamber in the piston and the chamber in the abutment, and means for moving the piston away from the abutment to establish communication between all of said conduits.

3. The combination with a blow pipe, of a gas-controlling valve comprising a chamber, a piston movable therein a piston rod connected with said piston, a conduit leading from the chamber to the nozzle of the blow pipe, a supply conduit, a chambered abutment to which said supply conduit connects and through which the piston rod passes, said piston constituting a chambered head having opening into said chamber in its face adjacent said abutment, said piston rod having a passageway between the chamber in the piston and the chamber in the abutment, and means for sealing the connection between the chamber in the abutment and the chamber in the piston.

4. The combination with a blow pipe, of means for controlling extra supply of gas to said blow pipe comprising a piston and piston rod, a chamber within which the piston is movable, an abutment against which the piston may abut in fluid tight relation and through which the piston rod passes, a spring tending to hold the piston against said abutment, means acting on the piston rod for moving said piston away from said abutment, said piston comprising a chambered head, said piston rod constituting a conduit between said head and the chamber in said abutment, a discharge conduit leading from the chamber within the piston is movable to the nozzle of the blow pipe, and a supply pipe in connection with the chamber in the abutment.

In testimony whereof I affix my signature.

PAUL DZUTSOFF.